United States Patent [19]

Daniels

[11] Patent Number: 4,493,078

[45] Date of Patent: Jan. 8, 1985

[54] METHOD AND APPARATUS FOR TESTING A DIGITAL COMPUTER

[75] Inventor: Stuart F. Daniels, Moorestown, N.J.

[73] Assignee: Siemens Corporation, Iselin, N.J.

[21] Appl. No.: 428,036

[22] Filed: Sep. 29, 1982

[51] Int. Cl.³ .............................................. G06F 11/00
[52] U.S. Cl. .................................... 371/25; 324/73 R
[58] Field of Search ................. 371/25, 27; 324/73 R

[56] References Cited

U.S. PATENT DOCUMENTS

| | | | |
|---|---|---|---|
| 4,108,359 | 8/1978 | Proto | 371/25 |
| 4,142,243 | 2/1979 | Bishop et al. | 371/25 X |
| 4,369,511 | 1/1983 | Kimura et al. | 371/25 X |
| 4,441,182 | 4/1984 | Best et al. | 371/25 |

Primary Examiner—Jerry Smith
Assistant Examiner—M. Edward Ungerman
Attorney, Agent, or Firm—Karl F. Milde, Jr.

[57] ABSTRACT

A system for on-line, concurrent self-testing of a computer is disclosed which is capable of checking the "test kernel" of the computer; that is, the portion of the computer that must be fault-free in order for the computer to test itself with a self-test program. The test kernel includes the computer CPU, the ROM which contains the self-test program, and the intraboard data, address and control buses, bus drivers and multiplexers. The system operates in a transparent fashion to test the computer during its normal operation. The system includes a linear feedback shift register connected to control signal outputs of the CPU and thus determines whether the CPU produces the proper control signals during fetch and/or execution of each program instruction.

29 Claims, 8 Drawing Figures

| FIG.6A | FIG.6B |
|---|---|
| FIG.6C | |

METHOD AND APPARATUS FOR TESTING A DIGITAL COMPUTER

BACKGROUND OF THE INVENTION

The present invention relates to a method and apparatus for testing a digital computer having, inter alia, a processor capable of executing instructions and a memory for storing the instructions to be executed by the processor. More particularly, the invention concerns a method and apparatus for checking the respective states of the control signals produced by the processor upon fetching and/or execution of each instruction.

Digital computers, which are realized in integrated circuit form, may be tested in one of two ways;

(1) Off-line, non-concurrent testing, which may be performed either initially, or periodically. This testing requires taking the processor out of service, comprehensively testing it, and finally returning it to service.

(2) On-line, concurrent testing; that is, real time monitoring of processor operation while it is performing actual applications.

The time to comprehensively test a device in an off-line non-concurrent mode increases as the number of gates, G within a device increases. The test time has been emperically shown to be proportional to $G^x$, where x depends on logic structure and $1 < x < 2$. Furthermore, given a constant percentage of fault coverage, the number of untested cells grows linearly with G. For example, a 99% test of a 1,000 logic cell device leaves 10 cells untested, whereas a 99% test of a 50,000 cell device (e.g., a 16 bit microprocessor) leaves 500 cells untested and takes between 50 and 2,500 times as long to test. In addition, the probability of "soft" or intermittent failures—due to whatever cause—within the device increases with increasing cell density.

At this point in time, the so-called 8 bit generation of microprocessors represents a stable and mature technology that has been used in many products for several years. State of the art products are now being designed with 16 bit microprocessors. The production, installation and maturing of products of this technology may now be considered to be in late childhood to early adolescence. The generation beyond the 16 bit processor is also emerging with the recent development of 32 bit integrated circuits.

The differences between 8, 16 and 32 bit microprocessors go much deeper than a comparison of the width of their data buses. It is the level of integration of functions and processing capabilities that are included within the device coupled with the number, size and density of internal logic cells that forms the real basis of comparison.

As we move from 8 bit microprocessor technology, through 16 bit, and on to 32 bit technology, it becomes more and more desirable to perform on-line testing, and less and less desirable to conduct off-line or periodically scheduled tests of these devices. This is because comprehensive off-line test procedures become too long and would steal or use too much processing time. Furthermore, the nature of soft failures indicates that if the processor passes an off-line test, there is no guarantee that it will not be subject to a soft failure upon its return to service. Conversely, a soft failure could occur during off-line testing that would indicate that a good device is bad.

The classical solution to on-line testing is to add redundant systems, where the results of two or more processors or processor boards or sub-systems are compared. However, just as device manufacturers cannot justify expenditures in silicon acreage above 10 to 15% for fault tolerance and testability, multiple redundancy at the board or sub-system level can only be economically justified in critical applications.

Thus, it would be desirable to provide a method and apparatus which effects some reasonable degree of on-line or concurrent verification coupled with a comprehensive off-line test capability for manufacturing and field repair testing. Ideally, the apparatus should ultimately be packaged in at best one, and certainly no more two, relatively inexpensive integrated circuits. It should interface in a simple and straightforward manner to the microprocessor signals and buses and it should neither compromise system performance nor unreasonably place extra burden on designers and programmers by its presence. In summary, a desirable solution would be one or two low cost chips that may be directly coupled to the microprocessor to be tested in a completely system transparent fashion.

While systems of this general type for on-line, concurrent self testing of microprocessors are known, prior systems are normally incapable of testing a so-called "test kernal" of the computer under test; that is, the portion of the computer that must be fault free in order for the self-test to operate in a meaningful fashion. The test kernal includes not only the microprocessor itself, but read only memory (ROM) that contains the self-test program, and the intra-board data, address and control buses, bus drivers and multiplexers. Faults within the kernal lead to erroneous and unpredictable system behavior and render the self-test useless. In a complete system, kernal faults are potentially dangerous in that they cause the microprocessor to follow a sequence of events that may be a radical departure from that specified by its program. Thus, they can lead to such dangerous and disastrous situations as the destruction of valuable memory files, invalidation of secure data in communications systems, or, in the case of control systems, causing physical harm to operators, machinery or processes.

SUMMARY OF THE INVENTION

It is a primary object of the present invention to provide a method and apparatus for testing the so-called "test kernal" of a computer.

It is a further object of the present invention to provide a method and apparatus for on-line, concurrent testing of a computer.

It is a further object of the present invention to provide a method and apparatus for testing a computer which may be realized in a single-chip integrated circuit and which may be directly coupled to the computer in a completely system transparent fashion.

These objects, as well as other objects, which will become apparent from the discussion that follows, are achieved, according to the present invention, by a method, and apparatus for executing this method, which are described below.

Assume that the digital computer to be tested has a processor for executing instructions and a memory, associated with the processor, for storing the instructions to be executed by the processor. These instructions stored in memory are selected from a prescribed set of instructions, each separate instruction of which is defined by a unique operation code. Typically the processor (which is normally an integrated circuit chip) has a number of control signal outputs and it generates control signals at these outputs during the periods that each instruction is fetched and/or executed. These control signals are used to initiate and control memory read and write operations as well as other input/output operations.

The method according to the present invention comprises the following steps:

(a) detecting when an operation code for an instruction to be executed by the processor is fetched from the memory;

(b) monitoring the control signals, which appear at the control signal outputs of the processor, during the fetching and/or execution of each instruction and producing a first, so-called "signature code"; that is, a unique code which corresponds each unique set of control signals;

(c) receiving the operation code of the instruction to be executed by the processor and producing a second signature code which corresponds to what the first signature code would be if the processor were operating properly; and (d) comparing the first and second signature codes and producing an output signal indicative of error if they are unequal.

Similarly, the apparatus for carrying out this method comprises the following elements:

(a) a control device for detecting when an operation code for an instruction to be executed by the processor is, or is to be, fetched from the memory;

(b) a first device, such as a parallel loaded linear feedback shift register ("LFSR"), connected to the control signal outputs of the processor and responsive to the control device, for producing a first signature code in dependence upon the control signals;

(c) a second device, such as a read-only memory (ROM) or programmable logic array (PLA), coupled to the memory and responsive to the control device, for producing a second signature code in dependence upon the operation code of the instruction to be executed by the processor; and (d) a third device, such as an equal comparator and connected to the first and second devices, for comparing the first and second signature codes and producing an output signal indicative of error if they are unequal.

As mentioned above, the first device may be a parallel loaded linear feedback shift register (LFSR). Such a device produces a "signature code" which is dependent upon the exact order in which information is received. Conceptually, this device consists of a block with a plurality of inputs for receiving the microprocessor control signals and plurality of outputs for producing the signature code. This block also has reset and clock inputs for clearing the register to zero and clocking in the control signal information. A suitable circuit for this purpose, a so-called "built-in logic block observer" or "BILBO", is disclosed in the U.S. Pat. No. 4,340,857 to Patrick Fasang.

DESCRIPTION OF THE PREFERRED EMBODIMENT

Figure 1:
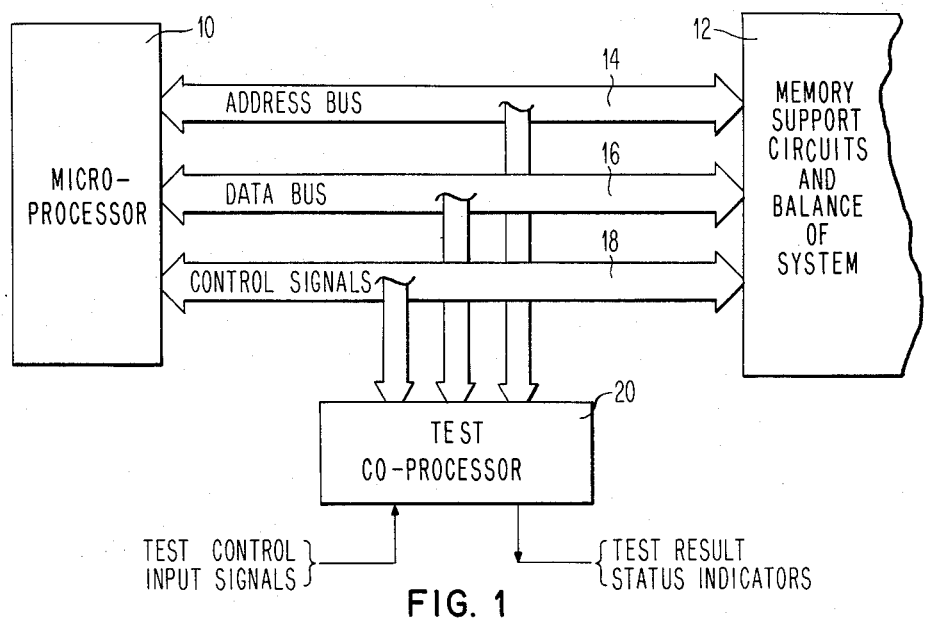
FIG. 1 is a block diagram showing how the testing apparatus of the present invention is interfaced with a digital computer.

The preferred embodiment of the present invention will now be described with reference to FIGS. 1-6 of the drawings. Identical elements in the various figures are designated by the same reference numerals.

FIG. 1 shows a computer comprising a microprocessor 10 connected to a memory, to support circuits and to the balance of the computer system 12 via address, data and control buses 14, 16, and 18 respectively. A so-called "test co-processor" 20 ("TCP") is connected to the address, data and control buses 14, 16, and 18 so as to receive the address signals, data signals and control signals, respectively. The TCP 20 also receives test control input signals which direct the TCP to perform specific functions. The TCP produces test result indicators that give an indication of its status and the results of its operation. The test control input signals and result indicators are application dependent; however, for conceptual purposes they may be viewed as toggle switches, push buttons and LED's for simple applications. For more sophisticated applications, they may be digital inputs and outputs interfaced to another processor.

The TCP 20 operates to perform concurrent, on-line, in situ tests on the microprocessor 10. The TCP determines whether the microprocessor is functioning properly and thereby removes the self-test kernal of a microprocessor based product from the processor itself. The TCP architecture is preferably easily self-testable and failsafe so that high credability and confidence of test results can be achieved.

The TCP may perform a number of test functions to verify the integrity of the microprocessor. One of these functions, according to the present invention, is to monitor the microprocessor's output control signals and to verify their behaviour and sequence as each instruction is executed. These signals, which are a function of the internal state of the microprocessor, are axiomatic to proper system operation and cannot be directly observed by the processor itself.

This particular implemention utilizes a linear feedback shift register ("LFSR") to produce a "signature code" in dependence upon the sequence of control signals that occur as the microprocessor executes each instruction. This first signature code is then compared to a second signature code, which is unique to each particular operation code. The apparatus thus verifies not only the fidelity of the control signals but also verifies that the microprocessor follows the proper sequence of internal control states as it executes each instruction. The latter verification is due to the manner in which the control signals are generated as an instruction is executed.

Figure 2:
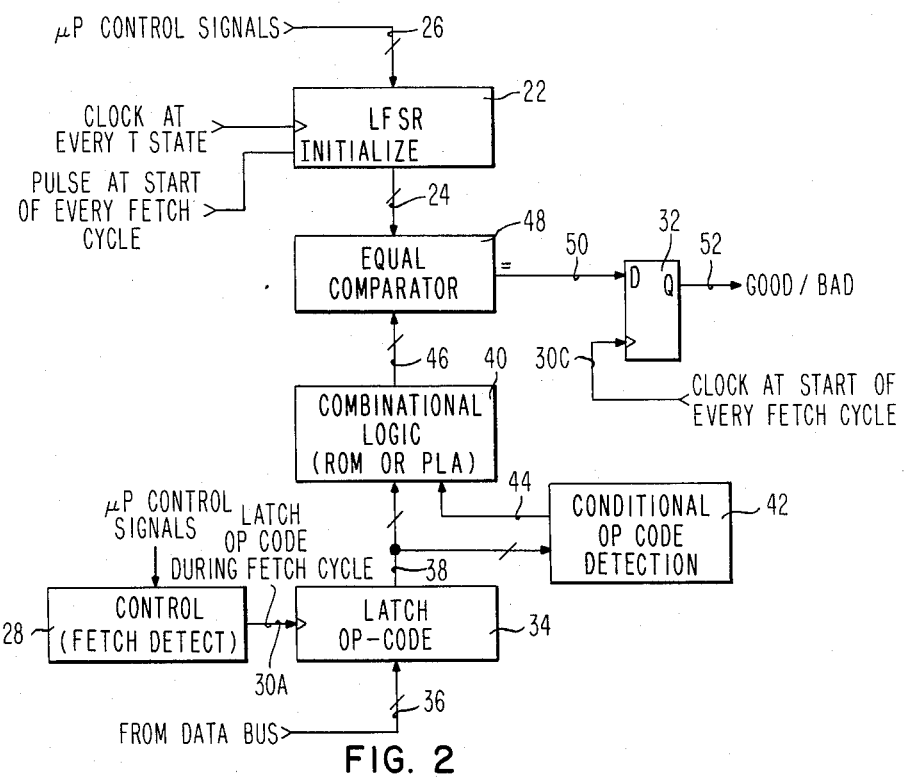
FIG. 2 is a block diagram of the testing apparatus according to the preferred embodiment of the present invention.

The testing apparatus shown in FIG. 2 includes an LFSR 22 which receives a plurality of control signals from the microprocessor as well as two signals for strobing data into and initializing the LFSR, respectively.

A first signal is presented in line 30D to provide repeated clock pulses for sampling the control signals at a plurality of time instances during at least a part of the period of fetching and execution of an instruction. This first signal may be interrupted during read or write operations so that the number of samples is not dependent on memory and/or peripheral device input/output access time. A second signal on line 30B initalizes the LFSR at the start of a fetch cycle; that is, it sets the LFSR to zero or to some other prescribed number.

The LFSR applies the first signature code to a plurality of output lines 24. This signature code is dependent upon the status and time sequence of the control signals presented at the input lines 26.

One or more of the microprocessor control signals are supplied to a control logic 28 which detects when the operation code for an instruction to be executed by the microprocessor is fetched from the computer memory. The start of this "fetch cycle" is indicated by output signals from the control logic on two output lines 30B and 30C. These signals are passed to the LFSR 22 (via line 30B), and to an output, error memory flip flop 32 (via line 30C). A third output signal on line 30A is produced during the fetch cycle when the operation code is present on the data bus in order to lock the operation code, which is received from the data bus on input lines 36, into a latch 34.

The operation code stored in the latch 34 is supplied via output lines 38 to combinational logic circuits which may be implemented, for example, by a read-only memory (ROM) or a programmable logic array (PLA) 40, and to a device 42 (actually part of the control logic 28) which detects certain conditional operation codes that must be treated differently than other operation codes as described hereinafter. The code detector 42 supplies a signal to the combinational logic 40 via line 44.

The signals on line 38, as well as signal on line 44, determine the address supplied to the ROM 40. Stored in the ROM 40, for each operation code, is a number, or second signature code, corresponding to the value of the first signature code which would be produced by the LFSR if the microprocessor were operating properly. This second signature code is thus the "expected" signature code for a particular operation code.

Therefore, when addressed by signals on lines 38 and 44 the ROM 40 will supply the second signature code, on its output lines 46, associated with the particular operation code stored in the latch 34. The first signature code on lines 24 and the second signature code on lines 46 are then applied to a comparator 48 which produces a signal on its output line 50 if and only if the two signature codes are equal. The digital signal on line 50 is clocked into the flip flop 32 at the beginning of the next fetch cycle. The output on line 52 of the flip flop 32 thus indicates whether the microprocessor was operating properly (first and second signature codes were equal) or whether an error was present (signature codes were unequal) during the previous instruction fetch and execution cycle.

Figure 3:
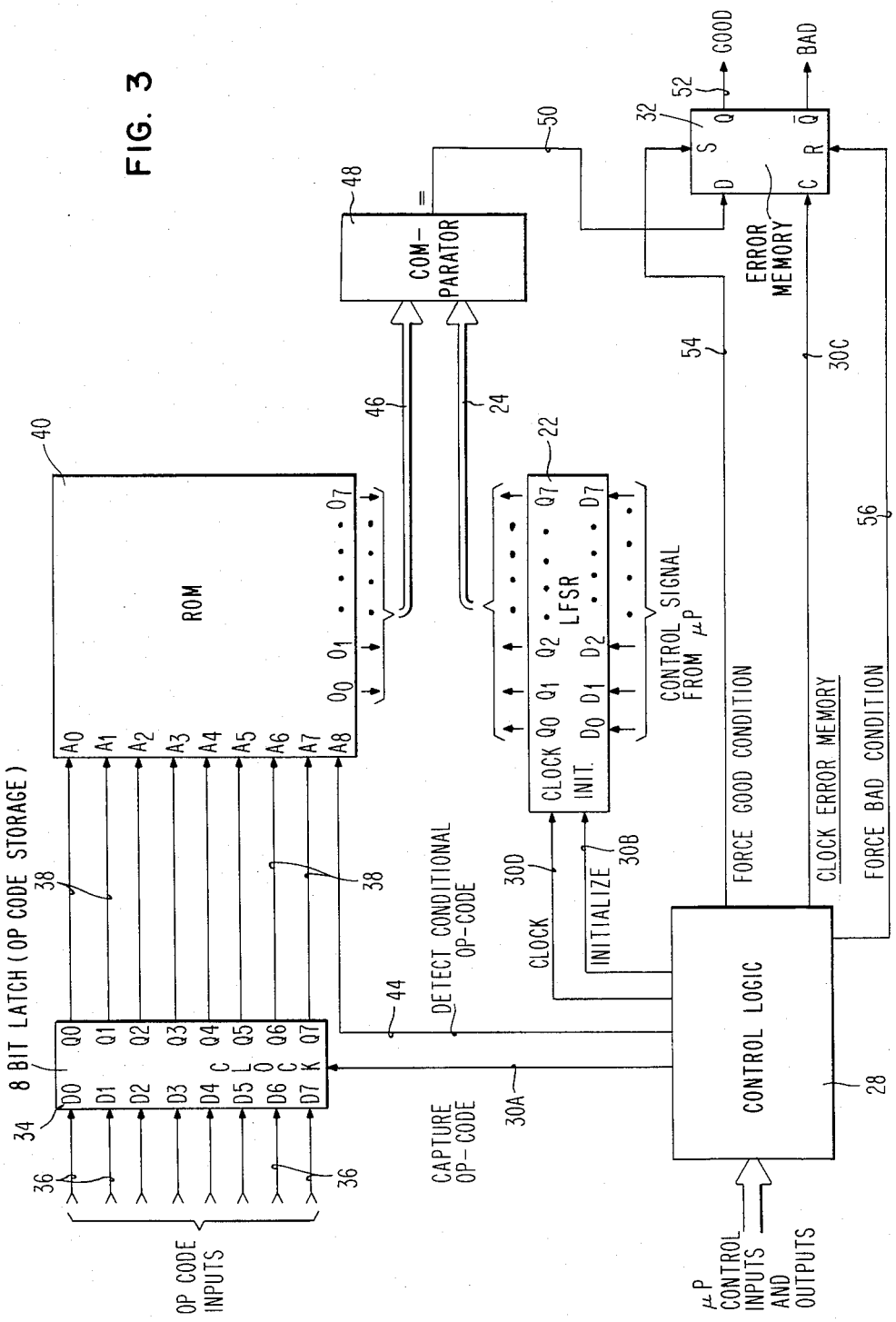
FIG. 3 is a more detailed block diagram of the testing apparatus of FIG. 2.

The appratus of FIG. 2 is illustrated in somewhat greater detail in FIG. 3. The only additional feature of the apparatus shown in FIG. 3 is the ability to force the flip flop 32 into a good condition or a bad condition, respectively, via signals on lines 54 and 56 applied to the set and reset inputs of this flip. flop. This capability is useful for the self-test of the test co-processor (TCP).

Figure 4:
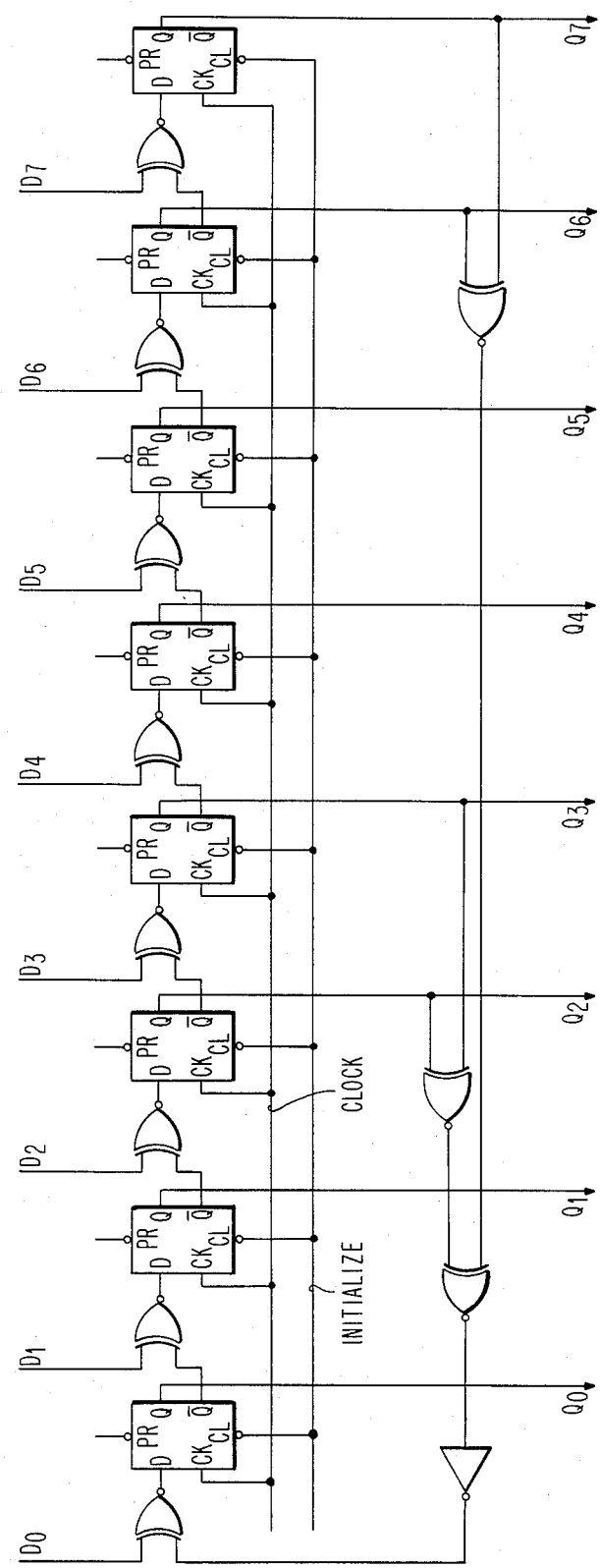
FIG. 4 is a schematic diagram of the linear feedback shift register (LFSR) employed in the apparatus of FIGS. 2 and 3.

As mentioned above, the LFSR 22 may be a so called "built-in logic block observer", or "BILBO", as disclosed in the U.S. Pat. No. 4,340,857 to Patrick Fasang. FIG. 4 shows a specific LFSR circuit which has eight inputs $D_0, D_1, D_2 \ldots D_7$ and eight outputs $Q_0, Q_1, Q_2 \ldots Q_7$, as well as the aforementioned clock and initialize inputs. This circuit operates to produce a "signature code" at the outputs which is dependent upon the exact order in which information is received at the inputs. Thus, this circuit should be distinguished from other data compression and code detection circuits which do not produce a unique output for a unique set and sequence of inputs. A particular advantage of the LFSR is that it is itself essentially self-testable since it may be clocked or cycled a predetermined number of times to form a signature code that will be unique only if the device is fault free.

The operation of the method and apparatus according to the present invention will now be described with reference to a particular microprocessor; namely, the Intel 8085. This microprocessor operates with the following control signals (among others):

CLK—Clock signal

ALE—Address Latch Enable—marks the cycles of processor operation.

$\overline{RD}$—Read—indicates when information is read from memory.

$\overline{WR}$—Write—indicates when information is—written into memory.

IO/M, S0 and S1—status signals for instruction fetch, interrupt acknowledgement, memory read and memory write, etc.

Figure 5:
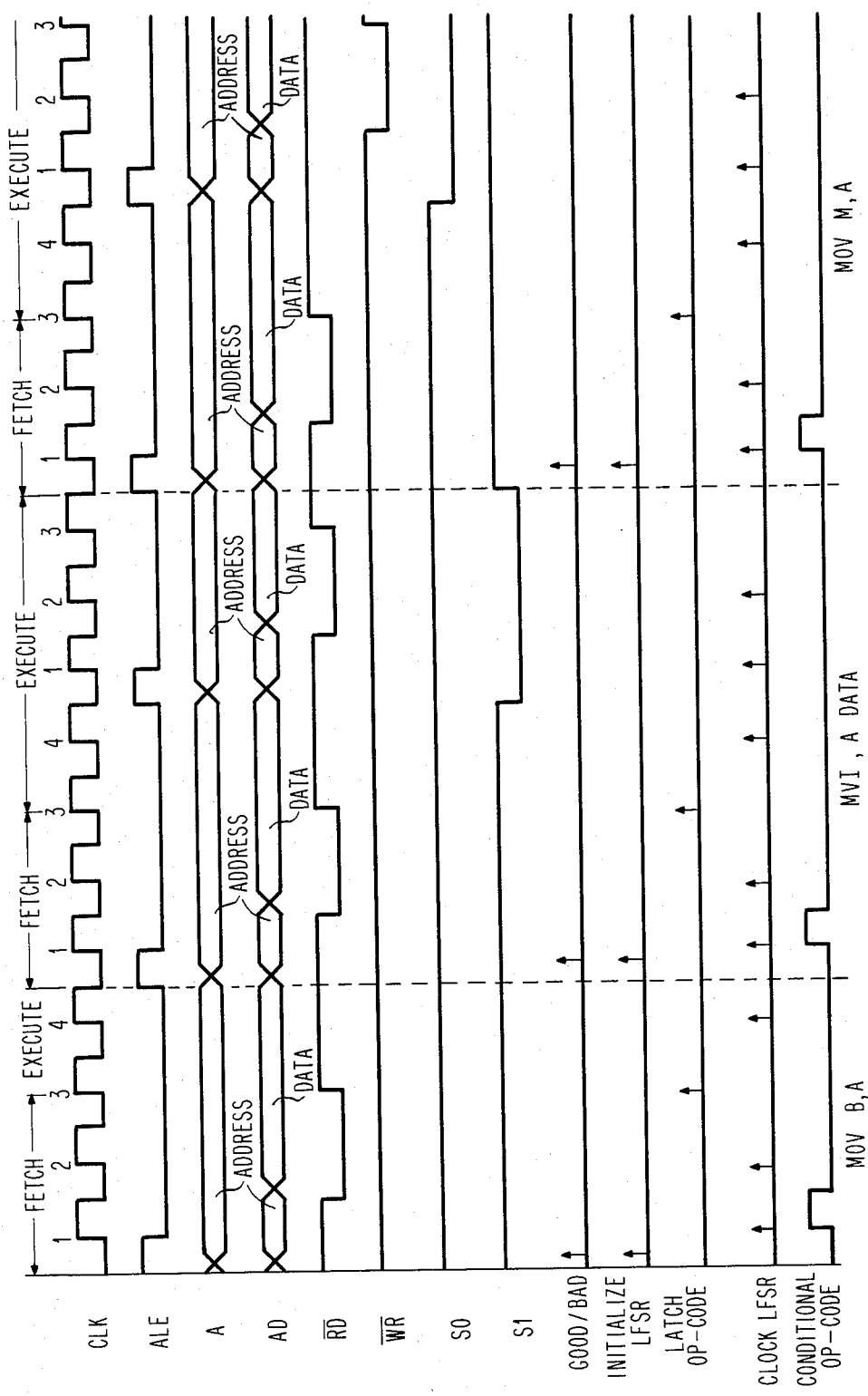
FIG. 5 is a timing diagram demonstrating the operation of the apparatus of FIGS. 2 and 3.

FIG. 5 shows the six control signals listed above plus the address bus (A) and data bus (AD) signals for three different instructions, selected from the instruction set of the 8085 microprocessor. These three instructions are:

MOV B,A—Move the contents of the internal A register to the internal B register.

MVI A, Data—Move data (the eight bits of data immediately following this eight bit instruction in memory) to the internal A register.

MOV M,A—Move the contents of the internal A register to memory location M, where M is specified by the internal H and L registers.

The start of the fetch cycle for each instruction commences with a positive-going ALE pulse. As may be seen in FIG. 5, the fetch cycle is completed, and the microprocessor commences to execute the instruction after $2\frac{1}{2}$ clock cycles. Address information is placed on both the address bus and the data bus as shown by the signals A and AD, respectively. Address information appears on the data bus for only one clock cycle; thereafter, this bus is used to supply data to or from the microprocessor.

If data is to be read from the computer memory, the signal $\overline{RD}$ goes low, initiating the data transfer. If information is to be written into the computer memory, the signal $\overline{WR}$ goes low, initiating the data transfer.

The lower half of FIG. 5 indicates the approximate times at which events occur in the microprocessor testing apparatus according to the invention. The control logic 28 initially detects that an instruction is being fetched from memory and clocks the flip flop 32 (via line 30C). It also initializes the LFSR 22 (via line 30B)

and, thereafter, captures the operation code in the latch 34 (via line 30A). After the LFSR is initialized, it is clocked by successive, positive-going CLK pulses so that the first signature code is produced for the particular control signals generated during the fetch and execution of the current instruction. During a read or write operation the clocking signal may be interrupted, as shown, so that the number of clock pulses is not dependent on memory access time.

After the operation code of the current instruction is captured in the latch 34, the latch outputs are supplied to the address inputs $A_0$-$A_7$ of the ROM 40. If a conditional operation code is detected, a signal may also be applied to the ROM address input $A_8$. In response to these address inputs, the ROM 40 presents a second signature code at its outputs $O_0$-$O_7$ which is applied to the equal comparator 48 via data lines 46. At the completion of the fetch and execute cycles, the first signature code is also supplied to the comparator 48 via the data lines 24. This comparator 48 produces a signal on line 50, if the two signatures are equal, which is passed to the "D" input of the error memory flip flop 32. This signal is clocked into the flip flop 32 upon receipt of the next clock pulse on line 30C.

Figure 6A:
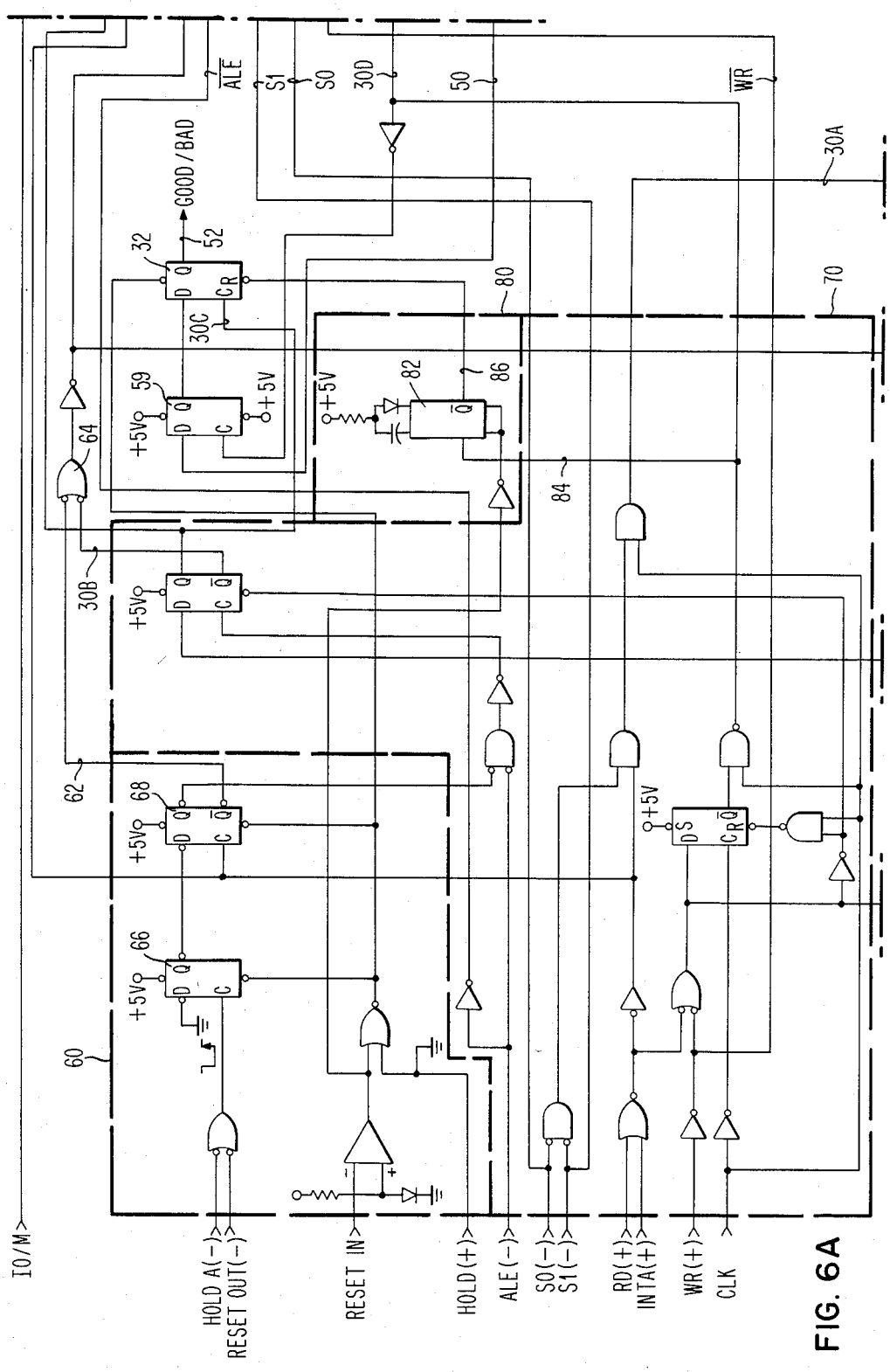
FIG. 6, which is comprised of FIGS. 6a and 6b, is a schematic diagram of the apparatus shown in FIGS. 2 and 3.
Figure 6B:
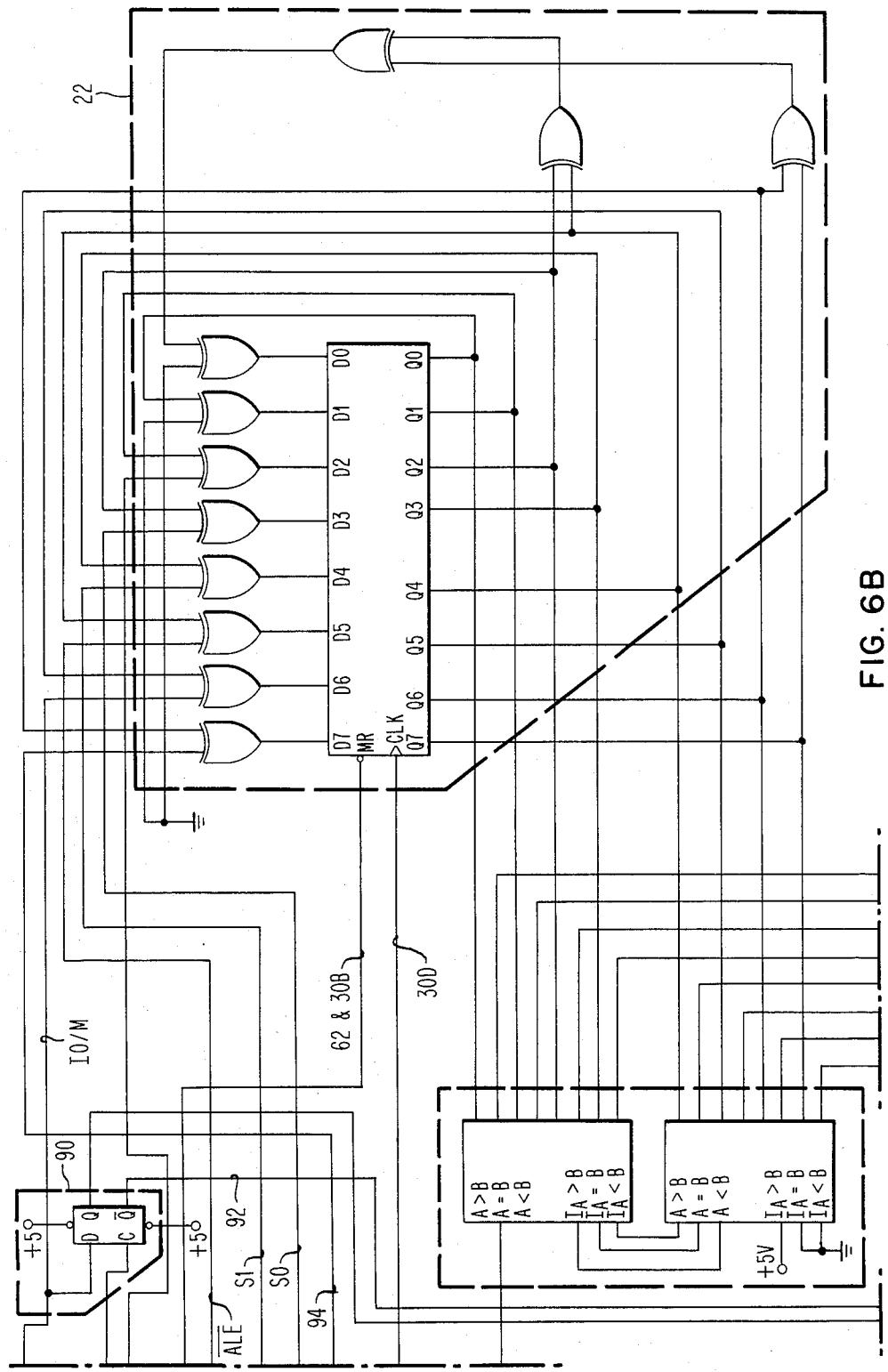
Figures 6, 6C:
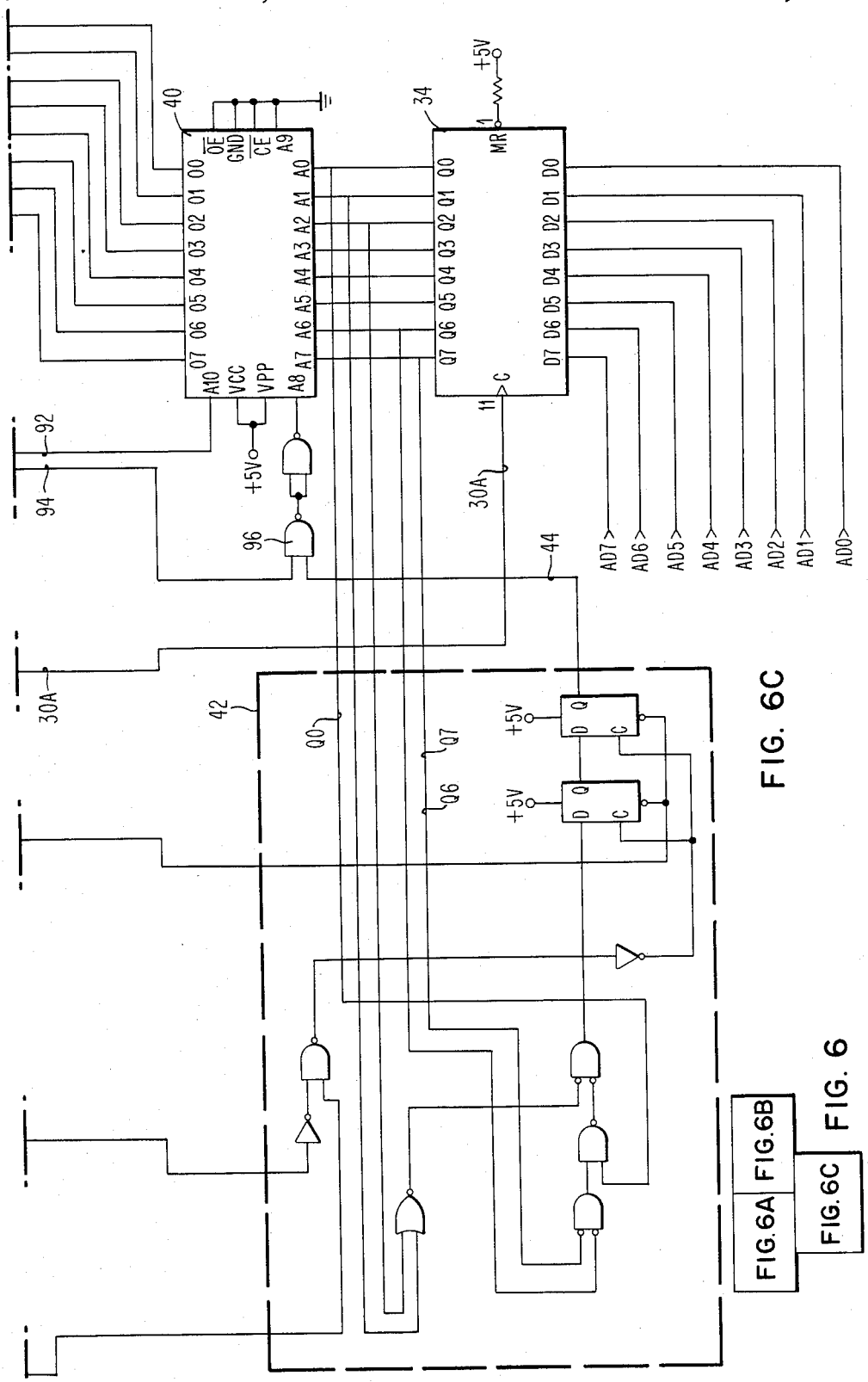

FIG. 6 is a schematic diagram of the best mode of the invention for checking all the control signals of an Intel 8085 microprocessor. These signals are IO/M (input-output)/memory), HOLD A (hold acknowledge), RESET OUT, RESET IN, HOLD, ALE (address latch enable), S0, S1, RD (read), INTA (interrupt acknowledge), WR (write) and CLK. These signals are applied to the control logic shown in FIG. 6 which selectively passes them to the LFSR indicated in FIG. 6 by the block 22. The operation code is received from the computer memory via the data bus lines AD0-AD7 and applied to the latch 34. The output of the latch is, in turn, applied to the ROM 40; the output of the ROM 40 is applied to the comparator 48. The comparator 48 produces an output on line 50 if the outputs of the LFSR 22 and ROM 40 are equal. This signal is passed to the error memory comprised of the buffer flip flop 59 and the error memory flip flop 32. This flip flop 32 produces the good/bad signal on the output line 52.

The remaining circuits in FIG. 6 comprise the control logic for the apparatus. This control logic includes several sections or "blocks" which will now be described.

Initialization circuitry: The block 60 contains circuitry for detecting the fetch of a first instruction following a reset or hold operation of the microprocessor. This circuit produces an output signal on line 62 which is passed through an OR-gate 64 to clear the LFSR to the desired initial state (e.g., zero). The initialization circuitry sets a flip flop 66 after a reset or hold condition and the output of this flip flop is clocked into an output flip flop 68 when the next (first) instruction is fetched.

Instruction Fetch Detection: The block 70 gates together the signals ALE, S0, S1, RD, INTA, WR and CLK to detect when the microprocessor fetches an instruction from memory. This circuit produces the aforementioned timing pulses on output lines 30A, 30B, 30C, and 30D at the commencement of each instruction fetch.

Watchdog Timer: The control circuit includes a watchdog timer in block 80 formed by a retriggerable monostable multivibrator (one-shot) 82 which receives a pulse on line 84 each time that the LFSR is clocked. If, for some reason, such a pulse is not received before the multivibrator 82 times out, it sends a signal on line 86 to the error memory flip flop 32 to reset this flip flop, thereby producing an error signal at its output.

Conditional Branch Instruction Detection: A circuit shown in block 42 detects the operation codes of three conditional branch instructions; namely, Jump, Call and Return. It is necessary to treat these instructions differently from other instructions because the LFSR will produce one of two signature codes depending upon how the condition is satisfied in each case. If the program branches one way, one signature code will be generated; if it branches the other way another signature code will be generated. The circuit 42 is required to select between one of two addresses in the ROM 40, for each conditional instruction, depending upon (1) the presence of a conditional branch instruction and (2) the condition that the processor determined was satisfied which is indicated by the number of memory read or write cycles that follow the fetch cycle. The circuit 42 thus supplies a signal on line 44 to address input A8 of the ROM 40 to select a particular bank of the 8 bit addresses supplied to the inputs A0-A7.

Interrupt Detection: The control logic in FIG. 6 includes a block 90 which detects the acknowledgement of an interrupt condition by the microprocessor. In the case of an interrupt, the control signal IO/M is in the opposite state than for a normal fetch. When an interrupt is detected, a signal is supplied to the output line 92 which is passed to the address input A10 of the ROM 40 to address still another bank of signature codes selected by the addresses A0-A7. This causes the ROM to produce a special signature code to match that produced by the LFSR during an interrupt cycle of the microprocessor.

In the alternative, a signal is provided on line 94 to open an AND-gate 96 and permit the signal on line 44 to pass to the ROM input A8.

There has thus been shown and described a novel method and apparatus for testing the control signals of a computer which fulfills all the objects and advantages sought therefor. Many changes, modifications, variations and other uses and applications of the subject invention will, however, become apparent to those skilled in the art after considering this specification and the accompanying drawings which disclose the preferred embodiment of the invention. All such changes, modifications, variations and other uses and applications which do not depart from the spirit and scope of the invention are understood to be covered by the invention which is limited only by the claims which follow.

What is claimed is:

1. A method for testing a digital computer having (a) processor means for executing instructions and (b) memory means, associated with said processor means, for storing the instructions to be executed by said processor means, said instructions being selected from a prescribed set of instructions, each separate instruction in said set being defined by a unique operation code; wherein said processor means includes a plurality of control signal outputs and means for generating control signals at said outputs upon execution of each instruction;

said method comprising the steps of
(a) detecting when an operation code for an instruction to be executed by said processor means is fetched from said memory means;
(b) monitoring said control signals appearing at said outputs during the execution of said instruction and producing a first signature code in response thereto, wherein one unique first signature code corresponds to each unique set of control signals;

(c) receiving the operation code of the instruction to be executed by said processor means and producing a second signature code in response thereto, said second signature code corresponding to what said first signature code would be if said processor means were operating properly;

(d) comparing said first and said second signature codes and producing an output signal indicative of error if they are unequal.

2. The method defined in claim 1, wherein said monitoring step includes the steps of:

(1) receiving said control signals during at least a part of the period of execution of said instruction;

(2) repeatedly sampling said control signals at a plurality of time instants during said period; and (3) producing said first signature code in dependence upon the respective states of said control signals at said plurality of time instants.

3. The method defined in claim 2, wherein said digital computer further comprises a clock generator for producing a clock signal and wherein said monitoring step includes the step of sampling said control signals synchronously with said clock signal.

4. The method defined in claim 3, including the step of sampling said control signals a prescribed number of times each clock cycle except that the number of sampling times is always the same during read or write operations and independent of the length of time such read or write operations require.

5. The method defined in claim 2, wherein said monitoring step includes the step of monitoring said control signals additionally during the fetching of said instruction, such that said first signature corresponds to said control signals during both fetching and execution of said instruction.

6. The method defined in claim 1, wherein said receiving step includes the steps of:

(1) determining from said operation code whether a conditional branch instruction is to be executed by said processor means; and (2) if a conditional branch instruction is to be executed, selecting and producing one of at least two possible second signature codes, in dependence upon which condition is satisfied.

7. The method defined in claim 1, further comprising the step of forcing said output signals into prescribed, desired states and thereafter carrying out said steps of monitoring said control signals and producing a signature code in response thereto, thereby to test the operation of said method of testing.

8. The method defined in claim 1, further comprising the step of watchdog timing the period between successive fetches of instructions, and setting said output signal to the error indicating state if said period exceeds a prescribed maximum time.

9. The method recited in claim 1, further comprising the steps of:

(e) detecting the acknowledgement of an interrupt condition by said processor means; and (f) if said interrupt acknowledge condition is detected, selecting a second signature code which corresponds to the first signature code produced by the control signals during the interrupt acknowledgement cycle of the microprocessor.

10. Apparatus for testing a digital computer having (a) processor means for executing instructions and (b) memory means, associated with said processor means, for storing the instructions to be executed by said processor means, said instructions being selected from a prescribed set of instructions, each separate instruction in said set being defined by a unique operation code; wherein said processor means includes a plurality of control signals outputs and means for generating control signals at said outputs upon fetching and execution of each instruction in said set; said apparatus comprising, in combination:

(a) control means coupled to said control signal outputs, for detecting when an operation code for an instruction to be executed by said processor means is fetched from said memory means;

(b) first means, connected to said control signal outputs and responsive to said control means, for producing a first signature code in dependence upon said control signals during a prescribed period of time, wherein one unique first signature code corresponds to each unique set of control signals during said period of time;

(c) second means, coupled to said memory means and responsive to said control means, for producing a second signature code in dependence upon the operation code of the instruction to be executed by said processor means, said second signature code corresponding to what said first signature code would be if said processor means were operating properly; and (d) third means connected to said first and said second means for comparing said first and said second signature codes and producing an output signal indicative of error if they are unequal.

11. The apparatus defined in claim 10, wherein said first means includes means for repeatedly sampling said control signals at a plurality of time instants, thereby to produce said first signature code in dependence upon the respective states of said control signals at plurality of time instants.

12. The apparatus defined in claim 11, wherein said digital computer further comprises a clock generator for producing a clock signal and said means for repeatedly sampling is responsive to said clock signal to sample said control signals synchronously with said clock signal.

13. The apparatus defined in claim 12, wherein said sampling means repeatedly samples said control signals a prescribed number of times each clock cycle except that the number of sampling times is always the same during read or write operations and independent of the length of time such read or write operations require.

14. The apparatus defined in claim 11, wherein said first means is a built-in logic block observer.

15. The apparatus defined in claim 10, wherein said second means includes combinational logic means for storing a plurality of said second signature codes.

16. The apparatus defined in claim 15, wherein said combinational logic means a read-only memory.

17. The apparatus defined in claim 15, wherein said second means includes (1) decoding means, coupled to said memory means and responsive to said control means, for determining from said operation code whether a conditional branch instruction is to be executed by said processor means; and (2) logic means, coupled to said decoding means, for selecting one of at least two possible second signature codes, in dependence upon which condition is satisfied.

18. The apparatus defined in claim 10, further comprising means for forcing said output signals into a prescribed, desired states, thereby to test the operation of said testing apparatus.

19. The apparatus defined in claim 10, further comprising means for initializing said first means to a prescribed, desired state upon detecting the fetching of the first instruction following an idle condition of said processor means.

20. The apparatus defined in claim 10, further comprising watchdog timer means, coupled to at least one of said control signal outputs and to said third means, for timing the period between successive fetches of instructions and setting said third means to the error-indicating state if said period exceeds a prescribed maximum time.

21. The apparatus recited in claim 10, further comprising logic means, coupled to at least one of said control signal outputs and to said third means, for detecting the acknowledgement of an interrupt condition by said processor means, and if said interrupt acknowledge condition is detected, selecting a second signature code which corresponds to the first signature code produced by the control signals during the interrupt acknowledgement cycle of the microprocessor.

22. A method for testing a digital computer having (a) processor means for executing instructions and (b) memory means, associated with said processor means, for storing the instructions to be executed by said processor means, said instructions being selected from a prescribed set of instructions, each separate instruction in said set being defined by a unique operation code; wherein said processor means includes a plurality of control signal outputs and means for generating control signals at said outputs upon fetching of each instruction; said method comprising the steps of
  (a) detecting when an operation code for an instruction to be executed by said processor means is fetched from said memory means;
  (b) monitoring said control signals appearing at said outputs during the fetching of said instruction and producing a first signature code in response thereto, wherein one unique first signature code corresponds to each unique set of control signals;
  (c) receiving the operation code of the instruction to be executed by said processor means and producing a second signature code in response thereto, said second signature code corresponding to what said first signature code would be if said processor means were operating properly;
  (d) comparing said first and said second signature codes and producing an output signal indicative of error if they are unequal.

23. The method defined in claim 23, wherein said monitoring step includes the steps of:
  (1) receiving said control signals during at least a part of the period of fetching of said instruction;
  (2) repeatedly sampling said control signals at a plurality of time instants during said period; and
  (3) producing said first signature code in dependence upon the respective states of said control signals at said plurality of time instants.

24. The method defined in claim 24, wherein said digital computer further comprises a clock generator for producing a clock signal and wherein said monitoring step includes the step of sampling said control signals synchronously with said clock signal.

25. The method defined in claim 25, including the step of sampling said control signals a prescribed number of times each clock cycle except that the number of sampling times is always the same during read or write operations and independent of the length of time such read or write operations require.

26. The method defined in claim 23, wherein said receiving step includes the steps of:
  (1) determining from said operation code whether a conditional branch instruction is to be executed by said processor means; and
  (2) if a conditional branch instruction is to be executed, selecting and producing one of at least two possible second signature codes, in dependence upon which condition is satisfied.

27. The method defined in claim 23, further comprising the step of forcing said output signals into prescribed, desired states and thereafter carrying out said steps of monitoring said control signals and producing a signature code in response thereto, thereby to test the operation of said method of testing.

28. The method defined in claim 23, further comprising the step of watchdog timing the period between successive fetches of instructions, and setting said output signal to the error-indicating state if said period exceeds a prescribed maximum time.

29. The method recited in claim 23, further comprising the steps of:
  (e) detecting the acknowledgement of an interrupt condition by said processor means; and
  (f) if said interrupt acknowledge condition is detected, selecting a second signature code which corresponds to the first signature code produced by the control signals during the interrupt acknowledgement cycle of the microprocessor.

* * * * *